J. A. BECHTEL.
CULLET HOPPER.
APPLICATION FILED DEC. 4, 1911.
1,164,977.
Patented Dec. 21, 1915.
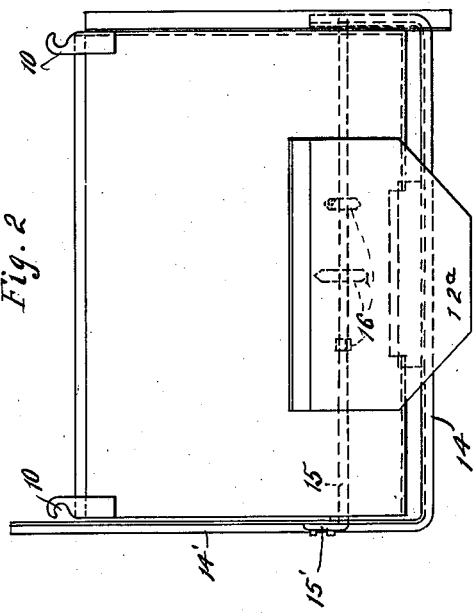
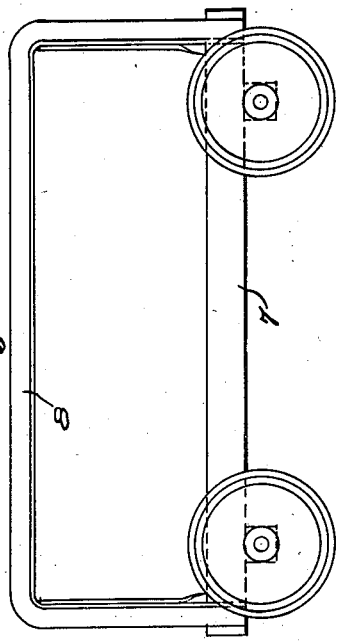
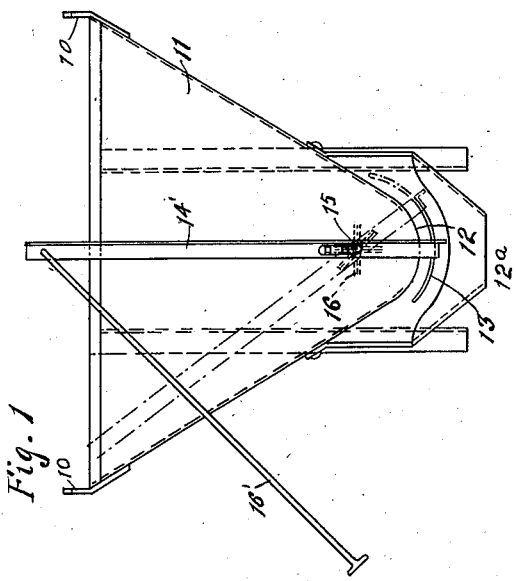
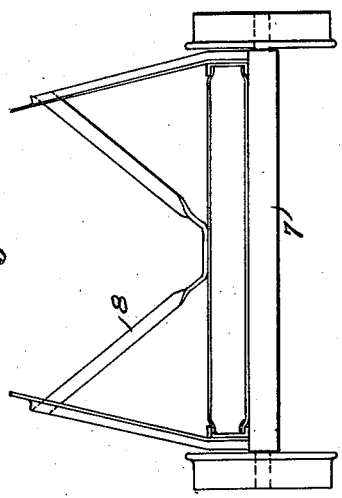
WITNESSES:
INVENTOR.
BY
ATTORNEY.

UNITED STATES PATENT OFFICE.

JOHN A. BECHTEL, OF TARENTUM, PENNSYLVANIA, ASSIGNOR TO PITTSBURGH PLATE GLASS COMPANY, OF PITTSBURGH, PENNSYLVANIA, A CORPORATION OF PENNSYLVANIA.

CULLET-HOPPER.

1,164,977.  Specification of Letters Patent.  Patented Dec. 21, 1915.

Application filed December 4, 1911. Serial No. 663,752.

*To all whom it may concern:*

Be it known that I, JOHN A. BECHTEL, a citizen of the United States, residing at Tarentum, in the county of Allegheny and State of Pennsylvania, have invented certain new and useful Improvements in Cullet-Hoppers, of which the following is a specification.

This invention has reference to a hopper construction for use in conveying cullet and similar substances employed in the manufacture of glass. Among the chief objects of the invention are: The provision of an improved hopper construction whereby the delivery or discharge of the contents is effectively directed and controlled; and the provision of improved discharge mechanism for hoppers, together with improved means for agitating the contents of the hopper operating in conjunction with said discharge mechanism. These together with such other objects as may hereinafter appear I attain by means of a construction illustrated in preferred form in the accompanying drawings of which Figure 1 is an end elevation of the hopper showing the control or discharge mechanism. Fig. 2 is a side elevation of Figure 1, and Figs. 3 and 4 are side and end elevations of a truck or carrier employed for shifting the hopper.

The hopper is primarily designed for use in the manufacture of glass, and is so constructed that it may be moved to and from the various melting pots and furnaces either by means of a truck 7 provided with a cradle 8 conforming to the shape of the hopper; or by means of an overhead traveling crane, the cable in such case being attached to the hooks 10 fastened in the body of the hopper.

The hopper is composed of a body portion 11 having converging sides and is provided at its lower portion with a gravity feed discharge orifice 12 indicated in dotted lines. The discharge of the cullet or other contents of the hopper is controlled by means of the gate 13 mounted on the frame 14. The frame 14 extends along the bottom of the hopper, is provided with upward extensions 14' adjacent the ends of the hopper, and is supported from the hopper by means of the shaft 15, the ends of which engage the upward extensions 14' in the manner indicated in Fig. 2. The shaft 15 extends through the body of the hopper above the discharge orifice and rotates freely in its bearings, but it is held against rotation with respect to the frame 14 by means of an upturned end 15' which is bolted to one of the extensions 14'. Mounted on the shaft within the hopper are a number of agitating devices 16. It will be noted that by this arrangement the shaft and its agitators are moved or rotated whenever the gate 13 is opened, thus rendering the device effective in that a discharge of the contents is always secured by the opening of the gate.

It will be observed that the left hand extension 14' of Figure 2 extends a substantial distance above the axis of rotation, the purpose of which is to provide a convenient means of rotating the frame 14. The handle 16' is secured at the top portion of this extension and the operator is thereby enabled to rock the frame and open the gate at a safe distance from the melting pot in which the cullet is to be discharged.

The gate 13 is spaced away from the discharge opening so that the gate may be readily closed. This arrangement is advantageous as pieces of cullet in the hopper may project beyond the edge of the dischaarge opening and would interfere with the closing of the gate were it immediately adjacent the opening. Beneath the gate and discharge opening is a funnel 12ª which is hung from the body of the hopper and is so constructed as to prevent the cullet from spreading as it leaves the hopper.

Having thus described my invention and illustrated its use, what I claim as new and desire to secure by Letters Patent is the following:

1. In combination, a cullet hopper having downwardly converging inclined walls, with the inclined lower portions thereof cut away to provide a discharge opening at the lower extremity of the hopper, a gate mounted to swing in an arc lying spaced jus tbelow the said opening and adapted to coöperate with the said cut away walls to form a closure for the said opening, means whereby the gate may be swung to position to permit of a discharge of the contents of the hopper through the said opening, and an agitator lying between the said inclined walls and above the said opening and operated by the actuation of the said gate.

2. In combination, a cullet hopper having downwardly converging inclined walls, with an opening at the bottom, a rod extending transversely of the hopper adjacent the lower end thereof and provided with a plurality of agitators lying inside the hopper, and a gate mounted to swing on said rod and lying spaced below the said opening, and means for turning the rod to move the agitators and swing the gate.

In testimony whereof I have hereunto signed my name in the presence of the two subscribed witnesses.

JOHN A. BECHTEL.

Witnesses:
  LETITIA A. MYERS,
  DOERING BELLINGER.